Figure 1:
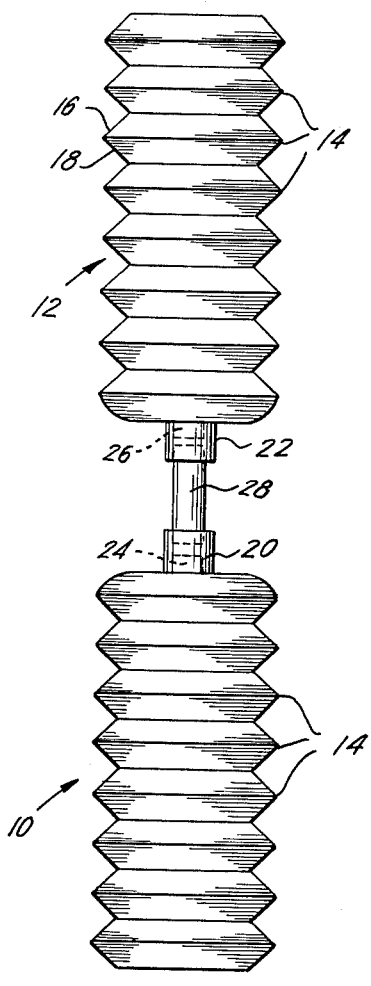

June 22, 1965     T. B. PENNEY ETAL     3,190,619

FLUID MIXING CONTAINER ASSEMBLY

Filed May 27, 1963

INVENTORS:
THEODORE B. PENNEY
ALFRED R. TAVAROZZI
BY RICHARD R. KNITTEL

*Walter C. Kehm*
ATTORNEY

United States Patent Office 3,190,619
Patented June 22, 1965

3,190,619
FLUID MIXING CONTAINER ASSEMBLY
Theodore B. Penney and Alfred R. Tavarozzi, Somerville, and Richard R. Knittel, Long Valley, N.J., assignors to Union Carbide Corporation, a corporation of New York
Filed May 27, 1963, Ser. No. 283,169
4 Claims. (Cl. 259—54)

This invention relates to the mixing and dispensing of fluids and more particularly to a container assembly for mixing fluids such as epoxy resins and their hardeners and for dispensing the mixture.

With the increasing popularity of fluids which must be stored separately and then mixed just prior to use, as for example, epoxy resins and their hardeners, containers capable of storing the fluids and subsequently mixing and dispensing the fluids have increased in importance. The general acceptance and the widespread use of these containers has been greatly hampered by the fact that in many applications one or more of the fluids are toxic, caustic, or otherwise hazardous to handle. For example, in the case of plumbing seals employing an epoxy resin mixed with a toxic amine hardener, the artisan who is to use the mixture, must be provided with premeasured quantities of the epoxy resin and hardener safely stored in separate containers, and must be provided with safe as well as simple means for first thoroughly mixing the resin and hardener and then dispensing the mixture at pressures up to 80 pounds per square inch (p.s.i.) or more, from "caulking guns" such as disclosed in U.S. Patents 2,838,210 or 3,042,268.

Containers which employ internally positioned pistons, for mixing and/or dispensing, present considerable personnel hazard during the step of opening the container for insertion of the piston. The prevention of leakage around a piston, particularly, during high pressure operations, required the use of complex, expensive seals. The close tolerances required between moving parts in order to prevent leakage result in frictional resistances which decrease with increasing operating pressures and decreasing viscosity and can make the equipment impractical to operate.

Containers which consist of one flexible container within another flexible container have been employed for the separate storage of fluids. Mixing is normally accomplished by applying pressure to the outer container, thereby causing a frangible seal on the inner container to break, and permitting the mixing of the separately stored fluids. These types of containers are not readily adaptable for use in dispensing guns, and employ a kneading type of mixing operation which does not provide for the adequate mixing of viscous fluids. A further difficulty is encountered in the premature breakage of the frangible seal and the consequent premature mixing of the separately stored ingredients.

It has now been found that fluids can be stored in separate containers which are readily axially compressible and provide not only for the convenient and thorough mixing of fluids, but also are adapted for use in dispensing guns having pistons which function externally of the containers thereby permitting the containers to be completely sealed, other than at the dispensing outlet.

According to the present invention an apparatus for mixing fluids is provided which includes a pair of resiliently flexible containers. Each of the containers has an interior chamber and a fluid within the chamber. The volume of the two fluids in combination is generally equal to the maximum volume of either chamber so that each chamber is independently capable of simultaneously holding both fluids.

The containers further have a flexible wall section which advantageously may be in the form of a plurality of interconnected, compressible bellows which provide for the axial compression and expansion of the containers. The interior chambers of the two containers are in communication so that the compression of the bellows of one container produces a decrease in the volume of the interior chamber of the container and forces fluid within the chamber to flow into the chamber of the other container.

A method of mixing fluids is as follows: A first fluid is maintained in a first enclosed zone, and a second fluid is maintained in a second enclosed zone, which is in communication with the first zone maximum. The volume of each of the zones is at least equal to the volume of the two fluids in combination. The volume of the first zone is decreased, forcing the fluid from the first zone into the second zone, and thus combining the first and second fluids within the second zone. The volume of the second zone is then decreased and the volume of the first zone is increased, forcing the combined fluids from the second zone through a restriction and into the first zone. The transfer of the combined fluids, from one zone to another through the restriction, is continued until the two fluids are mixed to the desired degree of uniformity.

Figure 3:
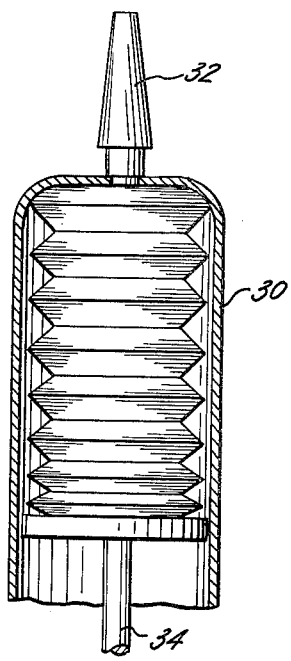
Figure 2:
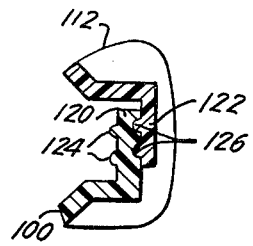

Further objects and advantages of the invention will be appreciated and the invention will be better understood from the following specification wherein the invention is described by reference to the embodiment illustrated by the accompanying drawings wherein:

FIGURE 1 is a plan view of a container assembly;
FIGURE 2 is a fragmentary section view of a modification of the containers of FIGURE 1, and
FIGURE 3 is a fragmentary plan view, partly in section of a partly compressed container mounted in a dispensing apparatus.

The apparatus consists basically of a pair of resiliently compressible containers 10 and 12. The containers must be capable of being repeatedly compressed and expanded to at least their uncompressed size. The material of the container is, therefore, preferably a resilient and flexible polymeric material as for example, a polyolefin such as polyethylene or polypropylene, flexible olefin copolymers such as poly(ethylene-ethyl acrylate), rubbery materials such as polybutadiene and butyl rubbers, isoprene polymers, natural rubber, plasticized vinyl resins or the like. The particular material of construction is not critical in this invention.

The material of the containers should be substantially inert and impervious to the contents of the containers or at least lined with an inert coating material. In the use of containers for the storage and subsequent mixing of an epoxy resin or complex epoxides and a hardener, low density polyethylene, preferably coated with a permeation resistant coating and heat cured gives the desired degree of flexibility, resiliency, inertness and impermeability.

While the container units can be formed into the desired shape and size by any convenient method, such as by slush molding, powder fusion, centrifugal casting and the like, the blow-molding process is preferred for the manufacture of the containers because of the low mold costs and the rapidity and accuracy of the process.

The containers has a compressible section which is formed of a plurality of interconnected, compressible, resilient bellows 14. Each of the individual bellows 14 is composed of two outwardly converging legs 16 and 18. The series of bellows, in combination form a hollow interior chamber.

The bellows wall thicknesses prevent the complete collapsing of the container and results in a rod shaped accumulation of material. The length of accumulated material is equal to the sum of the thicknesses of the legs of bellows and the diameter of the accumulated material is about equal to the inner diameter of the bellows. It is, therefore, desirable to use a minimum number of bellows. However, the difference between the inner and outer bellows diameters should be small in order to minimize the amount of material which will be trapped between the bellows legs and in order to provide an adequate container volume. The ease of compression decreases with increasing angles between the bellows legs and consequently the ease of compression increases with increases in the number of bellows (when bellows diameters are maintained constant). A bellows angle of approximately 90° provides proper functioning of the container with a minimum number of bellows.

Each of the containers 10 and 12 has an externally threaded neck member 24 and 26. The neck members may be joined by means of a pair of hollow, cylindrical, internally threaded coupling members 20 and 22 which are connected by an externally threaded, solid rod 28 which provides a fluid-tight seal. The seal must be adequate to prevent fluid leakage from the containers under normal handling conditions during storage.

During the mixing operation the container necks 24 and 26 are connected together by means of either of the female coupling members 20 or 22, which prevents external fluid leakage while maintaining the interior of the two containers in fluid communication. Mixing is accomplished in the binary container assembly by alternately compressing one container and then the other. Initially, fluid is transferred from the compressed container into the uncompressed container where it mixes with the fluid stored therein, and subsequently, the combined fluids are transferred back and forth between the two containers in order to obtain a uniform and homogeneous mixture.

The total volume of the fluids within the containers should not exceed the maximum internal volume of either container in order to permit the combined fluids to be completely contained, alternately by one container and then the other. While the containers are capable of some expansion due to their bellows construction, in a system, for example, wherein the fluids are to be mixed in a one to one ratio, slightly less than half filling each container with fluid provides for an efficient mixing of the fluids.

Advantageously, the neck members of two containers may be directly connected to each other, as shown in FIGURE 2. The inner diameter of female neck member 120, of one container 100, approximately equals the outer diameter of the male neck member 122, of the other container 112. The threaded engagement of the two neck members 120 and 122 provides a fluid-tight seal therebetween. The female neck member 120 may additionally be provided with external threads 124 in order to provide for the threaded engagement of a closure member, when the container 100 is to be used as a storage vessel. The external threads 126, of the male neck member 122 serve the dual function of receiving the female neck member 120 during the mixing operation and receiving a closure member during storage.

The closure member can consist of a pair of conventional threaded cap members, or coupling members such as 22 and 28, as shown in FIGURE 1, can be employed. In the latter case, the female coupling member 22 is secured at one end to the male neck 122, of the container 112, and at the other end to one end of rod 28. The other end of rod 28 is then secured to the female neck 120, of the other container 100. The interconnection by means of the threaded rod 28 serves to seal the containers while maintaining them together, in the same manner as containers 10 and 12 as shown in FIGURE 1.

The containers 100 and 112 can, advantageously be stored while interconnected as shown in FIGURE 2, through the use of a seal, such as a frangible diaphragm, across the open end of neck 122.

Either of the external threads 124 or 126 can serve the further function of enabling a dispensing member 32, to be threadedly secured thereto or a dispensing member can be integrally formed as part of the container. In the latter case, the dispensing member should be formed with a sealed end which is opened, as for example, by cutting or puncturing just prior to the dispensing operation. During the dispensing operation, the open neck member of the container with the integrally formed dispensing member, is sealed by means of a closure member in the same manner as employed for sealing the container during storage.

The filling operation, in the case of containers such as 110 and 112, employing a frangible seal across the neck 122 of container 112, and for use with fluids to be mixed, for example, in a one to one ratio, consists in about half filling, and preferably slightly less than half filling the container 112 with a first fluid and compressing the container until volume of the fluid about equals the compressed volume of the container. The frangible seal is then secured across the open end of the container as for example, by means of heat sealing or the like. The container 110 is then similarly half filled with the second fluid, compressed until the fluid volume equals the container volume, and sealed by threading together the two containers 110 and 112, as shown in FIGURE 2.

When the fluids are to be mixed, the seal is broken by holding the necks of the containers and applying pressure to the end of one container while leaving the other container free to expand.

Premature breakage of the frangible seal is unlikely during storage inasmuch as the containers resist compression, when a force other than an axial force is applied, and an axial pressure on the end of one container would normally be resisted by an equal axial force on the end of the outer container.

In the case of containers such as 10 and 12 which are to be sealed by means of threaded closure caps or coupling means such as members 20, 22 and 28, as shown in FIGURE 1, the containers are filled with the proper amount of fluid and then sealed. Prior to the mixing operation, each container can be opened and if desired compressed to expel a quantity of air from the container, the amount depending on the relative extensibility of the container. The two containers are then secured together, as previously noted, by means of a coupling member such as 20 or 22.

Other combinations of sealing and coupling means can readily be employed for sealing the containers during storage and providing fluid communication during the mixing operation, depending upon the requirements of a particular application. For example, containers such as 100 and 112, having unequally sized necks can be sealed by means of conventional type of closure caps, and interconnected by means of a tubular female coupler, similar to members 20 and 22, but dimensioned at one end to receive male neck 120 and at the other end to receive male neck 122. Coupling can also be provided by dimensioning the inner diameter of neck 120 and the outer diameter of neck 122 so as to yield a "press-fit" type of clearance between the two members and simply forcing neck 122 into neck 120.

The use of containers with dissimilar sized necks has the advantage of precluding the possibility of securing together two containers, each of which contains the same fluid, while the use of a tubular coupler has the advantage of not requiring the use of internal grooves, such as 120 of container 112, which can be inconvenient or expensive to form during the container manufacturing operations.

As a further modification, one or both of the containers 10 and 12 can be provided with frangible seals in the same manner as previously described in regard to container 112. The containers can then be coupled by means of a female coupler such as 20 or 22 and the seal or seals broken as previously noted, when mixing of the fluids is desired.

When providing both containers with frangible seals, the seals can, advantageously, be simultaneously broken by means of a sharp edged tubular cutting member positioned between the two seals. The two containers are secured together by means of an elongated tubular, female coupler which is of sufficient length to threadedly engage each container while maintaining the containers in a spaced relationship. The spacing must be adequate to enable the tubular cutting member to be positioned between the seals of the two containers. When the seals are to be broken, the containers are rotated and advanced towards each other thus decreasing the space between the seals until the cutting member is forced to sever each seal. The cutting member is preferably provided with small ridges or other similar means, in order to concentrically position the tubular cutting member within the tubular coupling member and in order to limit the extent to which the cutting member can enter each container, thus preventing the tubular cutting member from being forced through one seal and into one container without cutting the other seal.

The mixing operation is initiated by compressing one of the containers and causing the fluid contained therein to flow through the interconnected neck sections and into the other container where is combines with the fluid contained therein. Since, as previously indicated, each container is capable of completely containing the combined fluids, each subsequent compression of a container produces a substantially complete flow of the combined fluids from one container to the other.

The neck sections of the containers, as shown in FIGURES 1 and 3 are relatively narrow in comparison to the body of the containers. The neck thus acts as a restriction and produces turbulent flow which enables high viscosity as well as low viscosity fluids to be rapidly uniformly and homogeneously mixed.

As shown in FIGURE 3, the container with its uniformly mixed contents, is inserted into a dispensing gun 30 and a dispensing nozzle 32, is threadedly secured to the neck of the container. Pressure is applied to the container by means of a piston 34, which if desired, can be operated by fluid pressure in the manner well known in the art. It should be noted that as the bellows are compressed and the contents are forced out of the container, the bellows increase in diameter. Therefore, adequate clearance must be provided between the container in its uncompressed state and the interior of the dispensing gun, in order to prevent undue frictional engagement between the container and the interior of the dispensing gun.

Although the invention has been described in its preferred forms with a certain degree of particularity, it is understood that the present disclosure of the preferred forms has been made only by way of example and that numerous changes in the details of construction and the combination and arrangements of parts may be resorted to without departing from the spirit and the scope of the invention as hereinafter claimed.

What is claimed is:

1. An apparatus for mixing fluids within a pair of containers comprising; a first resiliently compressible container formed of a plurality of interconnected, compressible resilient bellows having an interior chamber and a second resiliently compressible container formed of a plurality of interconnected, compressible resilient bellows having an interior chamber; a first fluid within the interior chamber of said first compressible container and a second fluid within the interior chamber of said second compressible container, the maximum volume of the interior chambers of each of said compressible containers being at least equal to the volume of said first and said second fluid in combination; means for providing communication between the interior chamber of said first container and the interior chamber of said second container, whereby applying pressure to the walls of one compressible container decreases the internal volume of said one container and causes the fluid within said one container to transfer to the other container and combine with the fluid within said other container, and applying pressure to the walls of said other compressible container decreases the internal volume of said other container and causes the combined fluids to transfer to said one container.

2. An apparatus for use in the mixing of an epoxy resin and a hardener comprising; a binary container assembly; a first container forming a first section of said binary container assembly; a second container forming a second section of said binary container assembly; each of said containers having an interior chamber, a flexible wall portion and a passage member; the passage member of said first container being in screw-fit, fluid-tight, detachable engagement with the passage member of said second container and providing for communication between the interior chambers of said containers; a plurality of interconnected, compressible bellows forming said flexible walls portion of each of said containers, whereby compression of the bellows of said first container produces a decrease in the volume of the interior chamber of said first container and causes the fluid within said first container to transfer the chamber of said second container and combine with the fluid within said second container, and compression of the bellows of said second container produces a decrease in the volume of the interior chamber of said second container and causes said combination of said fluids in said second container to transfer to the chamber of said first container; and whereby alternately compressing said bellows causes said combined fluids to be repeatedly transferred from one container to the other until said combined fluids are substantially uniformly mixed.

3. The apparatus of claim 1 wherein said containers are essentially tubular in shape.

4. The apparatus of claim 1 wherein said containers are made of polyethylene.

References Cited by the Examiner
UNITED STATES PATENTS

| | | | |
|---|---|---|---|
| 455,516 | 7/91 | Pfeffer et al. | 206—47 |
| 1,677,603 | 7/28 | Steen | 128—216 X |
| 1,928,998 | 10/33 | Kovacs | 128—272 |
| 2,673,561 | 3/54 | Peterson | 128—216 |
| 2,724,383 | 11/55 | Lockhart | 128—215 |
| 2,773,521 | 12/56 | Persson | 128—272 X |
| 2,798,488 | 7/57 | Hall | 259—95 X |
| 2,871,856 | 2/59 | Steiner | 128—216 |
| 2,911,972 | 11/59 | Elinger | 128—216 |
| 2,950,717 | 8/60 | Bouet | 128—218.1 |
| 3,010,705 | 11/61 | Brown | 259—98 |
| 3,082,867 | 3/63 | Gelpey | 206—47 |

CHARLES A. WILLMUTH, *Primary Examiner.*